United States Patent
Takagi

(10) Patent No.: US 8,414,693 B2
(45) Date of Patent: Apr. 9, 2013

(54) HUMIDIFYING MEMBRANE MODULE

(75) Inventor: Takayuki Takagi, Kikukawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 12/920,551

(22) PCT Filed: Jul. 7, 2008

(86) PCT No.: PCT/JP2008/062278
§ 371 (c)(1),
(2), (4) Date: Sep. 1, 2010

(87) PCT Pub. No.: WO2009/110114
PCT Pub. Date: Sep. 11, 2009

(65) Prior Publication Data
US 2011/0000842 A1    Jan. 6, 2011

(30) Foreign Application Priority Data
Mar. 5, 2008   (JP) .................................. 2008-054446

(51) Int. Cl.
*B01D 53/22*   (2006.01)
*B01D 63/02*   (2006.01)

(52) U.S. Cl.
USPC ...... 96/4; 96/8; 95/52; 210/321.6; 210/321.8; 55/502

(58) Field of Classification Search .............. 96/4, 8, 96/10; 95/52; 210/321.6, 321.8, 321.89; 55/502
See application file for complete search history.

(56) References Cited

U.S. PATENT DOCUMENTS

| | | | | |
|---|---|---|---|---|
| 4,207,192 A | * | 6/1980 | Coplan et al. | 96/8 |
| 4,671,809 A | * | 6/1987 | Taketomo et al. | 96/8 |
| 5,066,397 A | * | 11/1991 | Muto et al. | 96/8 |
| 5,376,167 A | * | 12/1994 | Broutin et al. | 96/8 |
| 6,224,763 B1 | * | 5/2001 | Feng et al. | 210/321.8 |
| 6,648,945 B1 | * | 11/2003 | Takeda et al. | 96/8 |
| 7,014,765 B2 | * | 3/2006 | Dannenmaier | 210/321.8 |
| 7,491,258 B2 | * | 2/2009 | Gouzou et al. | 96/8 |
| 2007/0251201 A1 | * | 11/2007 | Miller | 55/502 |
| 2007/0278145 A1 | * | 12/2007 | Taylor et al. | 210/321.6 |
| 2009/0039010 A1 | * | 2/2009 | Hayashi | 210/321.8 |

FOREIGN PATENT DOCUMENTS

| | | |
|---|---|---|
| JP | 63-029566 A | 6/1988 |
| JP | 04-010375 A | 2/1992 |
| JP | 04-135630 A | 5/1992 |
| JP | 2003-159517 A | 6/2003 |
| JP | 2004-202478 A | 7/2004 |
| JP | 2005-224719 A | 8/2005 |

* cited by examiner

*Primary Examiner* — Jason M Greene
(74) *Attorney, Agent, or Firm* — Harness, Dickey & Pierce, P.L.C.

(57) ABSTRACT

To provide a humidifying membrane module that is reduced in weight, size and cost by making a case in a single layer structure, the humidifying membrane module has a hollow fiber membrane bundle constructed from plural hollow fiber membranes, a case accommodating the hollow fiber membrane bundle, a first flow passage extending through hollows of the hollow fiber membranes, and a second flow passage extending through the outer surface sides of the hollow fiber membranes, the membrane bundle and the case are simultaneously integrated at both ends of the membrane bundle by using potting members sealing gaps between the membrane bundle and the case, an inlet and an outlet constructing the first flow passage are formed at the both ends of the case respectively, and an entrance and an exit constructing the second flow passage are formed in side surfaces near the both ends of the case respectively.

6 Claims, 3 Drawing Sheets

HUMIDIFYING MEMBRANE MODULE

CROSS-REFERENCE TO THE RELATED APPLICATIONS

This is a national stage of International Application No. PCT/JP2008/062278 filed on Jul. 7, 2008 and published in the Japanese language. This application claims the benefit of Japanese patent Application No. 2008-054446 filed on Mar. 5, 2008. The disclosures of the above applications are incorporated herein by reference.

BACKGROUND OF THE INVENTION

1. Field of the Invention

The present invention relates to a humidifying membrane module.

Further, the present invention relates to a humidifying membrane module which is useful for filtrating various materials by using a hollow fiber type separation membrane.

Further, the present invention is particularly useful as a humidifying membrane module for a fuel battery.

2. Description of the Conventional Art

Conventionally, the humidifying membrane module is structured such that air to be humidified passes through a hollow fiber membrane and humidified air passes outside the hollow fiber membrane.

Further, as this kind of humidifying hollow fiber membrane module, there have been known a structure of a humidifying hollow fiber membrane module for a fuel battery as disclosed in Japanese Unexamined Patent Publication No. 2004-202478 or Japanese Unexamined Patent Publication No. 2005-224719.

A description will be given of this kind of conventionally known humidifying hollow fiber membrane module on the basis of FIGS. 5 and 6.

In this case, FIG. 6 is a sectional view along a line A-A in FIG. 5.

In the figures, in order to feed water at a highest efficiency, an inflow port 600 and an outflow port 700 are arranged in a module case 500 in such a manner as to make humidified air flow toward an opposite side in an axial direction with 180 degree displacement in a circumferential direction from an end to another end, with respect to a hollow fiber membrane 100 in which both ends are potted by a filling adhesive agent 400.

Further, the humidified air passing through the inflow port 600 so as to flow into a chamber of the module case 500 is diffused in a longitudinal direction of the hollow fiber membrane 100.

Further, this kind of membrane module is structured such that the module case 500 is arranged within an outer case member (not shown), and a seal member is interposed in a gap between an inner wall surface of the outer case member and an outer wall surface of the module case 500, thereby sealing the gap in a liquid tight manner.

Further, an inlet and an outlet for making a fluid flow within the hollow fiber membrane are provided at both ends of the outer case member, and an entrance and an exit for making it flow on an outer surface of the hollow fiber membrane in a crossing manner are provided in side surfaces in the vicinity of both ends thereof, thereby being used.

However, since the case is constructed by a two-layer structure having the module case 500 and the outer case member, not only it is expensive but also a weight of a whole of a membrane module is heavy, and a shape can not help being enlarged.

Further, since the case is constructed by the two-layer structure, a lot of assembling man-hour is necessary.

SUMMARY OF THE INVENTION

Problem to be Solved by the Invention

The present invention is made by taking the problems mentioned above into consideration, and an object of the present invention is to provide a humidifying membrane module in which a weight of the whole of the membrane module can be made light by making a case as a single-layer structure, a manufacturing cost is inexpensive, and a downsizing can be achieved.

Means for Solving the Problem

In order to achieve the object mentioned above, in accordance with the present invention, there is provided a humidifying membrane module comprising:

a hollow fiber membrane bundle formed by a plurality of hollow fiber membranes;

a case accommodating the hollow fiber membrane bundle;

a first flow passage passing through hollow inner portions of the hollow fiber membranes; and a second flow passage passing through outer wall surface sides of the hollow fiber membranes, wherein the hollow fiber membrane bundle and the case are simultaneously integrated by potting members sealing gaps between the hollow fiber membrane bundle and the case, at both ends of the hollow fiber membrane bundle, an inlet and an outlet for constructing the first flow passage are provided respectively at both ends of the case, and an entrance and an exit for constructing the second flow passage are provided respectively in side surfaces in the vicinity of the both ends.

Effect of the Invention

The present invention has effects as described below.

In accordance with the humidifying membrane module of the invention described in a first aspect, it is possible to make a weight of the whole of the membrane module light, a manufacturing cost is inexpensive and downsizing can be achieved.

Further, in accordance with the humidifying membrane module of the invention described in a second aspect, it is possible to maintain a liquid tightness between the potting members and the inner peripheral surface of the case, even under a thermal influence.

Further, in accordance with the humidifying membrane module of the invention described in a third aspect, it is easy to execute the sealing member, and it is possible to better maintain sealing between the potting members and the inner peripheral surface of the case.

Further, in accordance with the humidifying membrane module of the invention described in a fourth aspect, it is possible to preferably handle a large quantity of sealing members.

Further, in accordance with the humidifying membrane module of the invention described in a fifth aspect, it is easy to assemble and dissemble the case.

Further, in accordance with the humidifying membrane module of the invention described in a sixth aspect, it is possible to simultaneously seal gaps between both end opening portions of a case main body and a first lid member and a second lid member by the sealing member, and it is thereby possible to simplify the structure.

Further, in accordance with the humidifying membrane module of the invention described in a seventh aspect, it is possible to enhance a performance of the humidifying membrane module.

Further, in accordance with the humidifying membrane module of the invention described in an eighth aspect, it is possible to better maintain the sealing between the potting member and the inner peripheral surface of the case, even under the thermal influence.

Further, in accordance with the humidifying membrane module of the invention described in a ninth aspect, it is possible to securely inhibit separation of the case main body and the potting members.

Further, in accordance with the humidifying membrane module of the invention described in a tenth aspect, it is particularly effective to use the humidifying membrane module as a humidifying membrane module of a fuel battery.

DETAILED DESCRIPTION OF PREFERRED EMBODIMENT

A description will be given below of a preferred embodiment for carrying out the present invention with reference to FIGS. 1 to 4.

Figure 1:
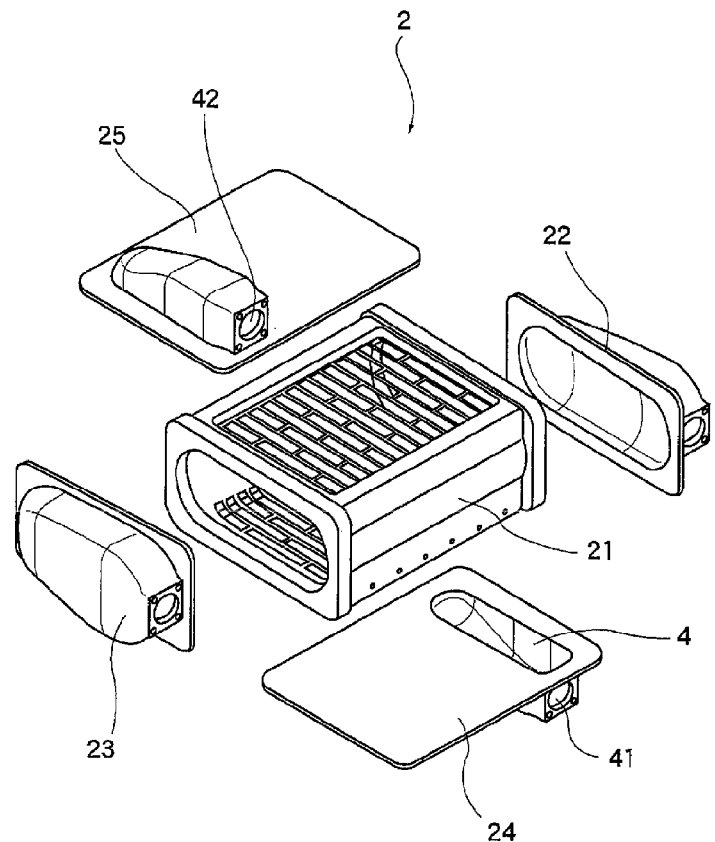
FIG. 1 is a perspective view before assembling a case used in a humidifying membrane module in accordance with the present invention.

FIG. 1 is a perspective view before assembling a case used in a humidifying membrane module in accordance with the present invention.

Figure 2:
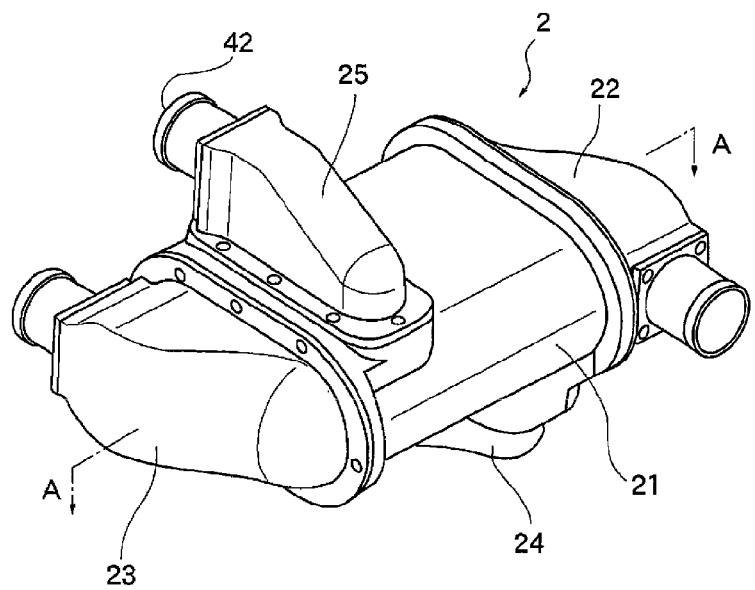
FIG. 2 is an assembly view of the humidifying membrane module in accordance with the present invention.

FIG. 2 is an assembly view of the humidifying membrane module in accordance with the present invention.

Figure 3:
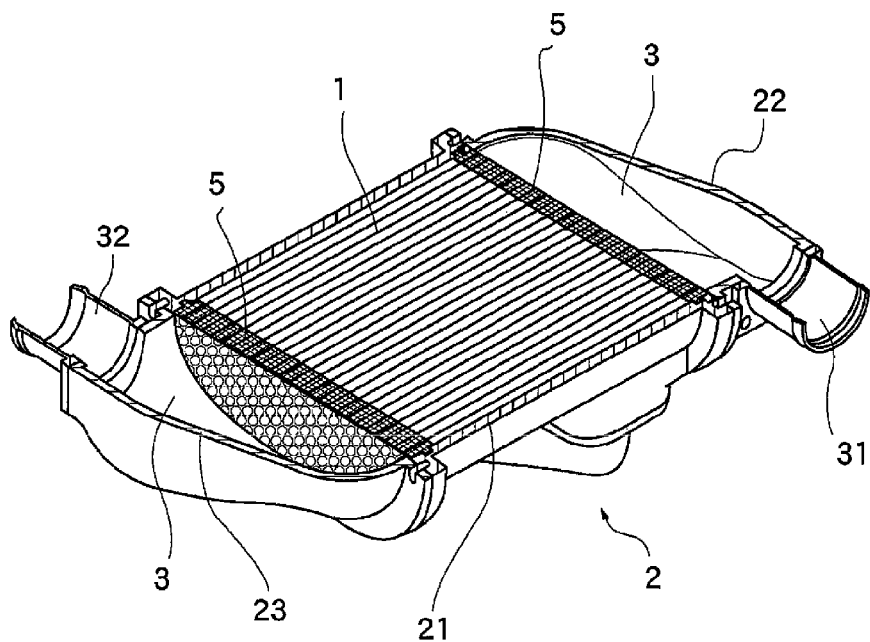
FIG. 3 is a sectional view along a line A-A in FIG. 2.

FIG. 3 is a sectional view along a line A-A in FIG. 2.

Figure 4:
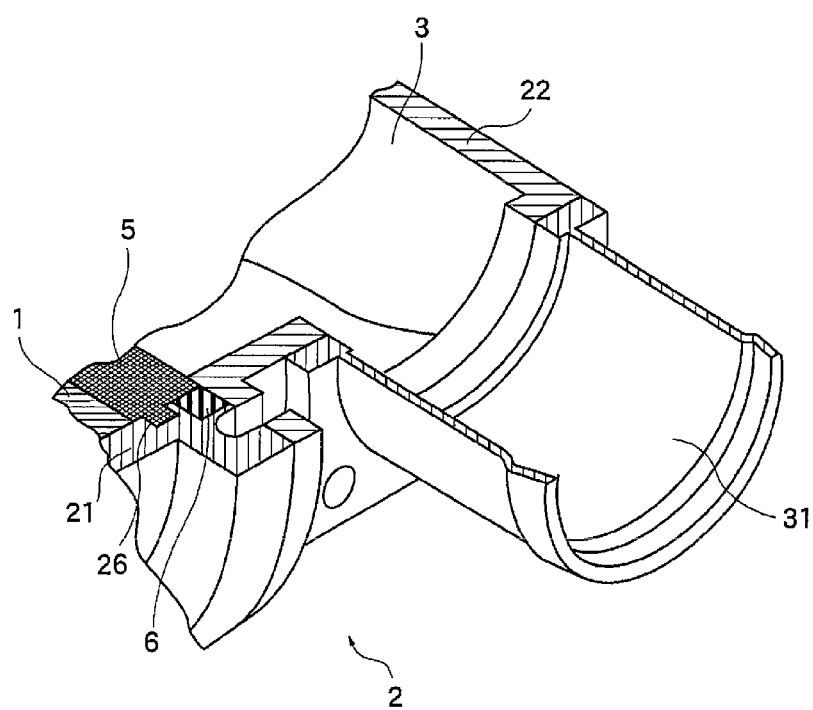
FIG. 4 is a partly enlarged view of FIG. 3.
Figure 5:
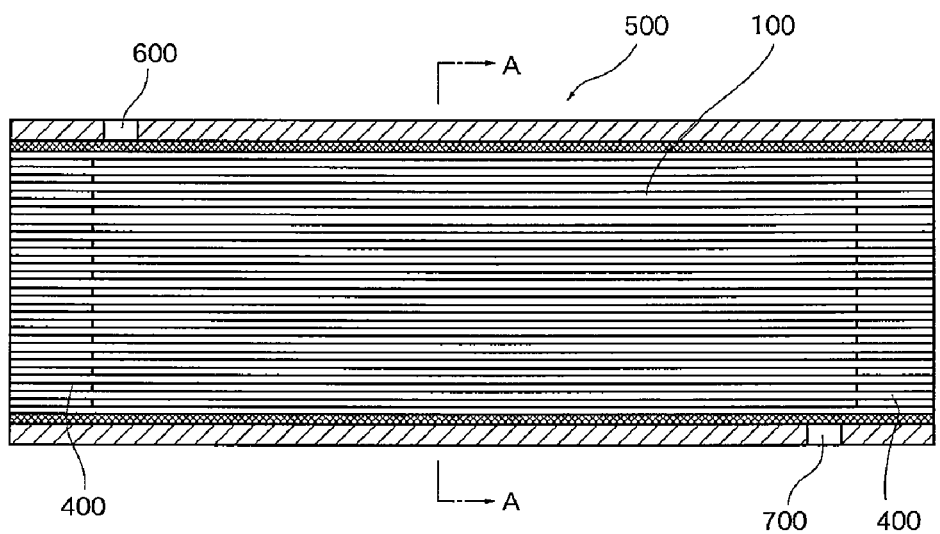
FIG. 5 is a sectional view of a humidifying membrane module in accordance with a conventional art.
Figure 6:
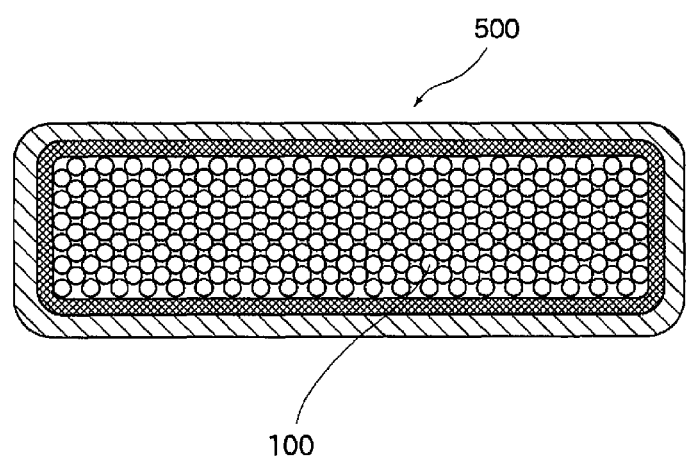
FIG. 6 is a sectional view along a line A-A in FIG. 5.

FIG. 4 is a partly enlarged view of FIG. 3.

The humidifying membrane module in accordance with the present invention is provided with a hollow fiber membrane bundle 1 formed by a plurality of hollow fiber membranes, a case 2 accommodating the hollow fiber membrane bundle 1, a first flow passage 3 passing through hollow inner portions of the hollow fiber membranes, and a second flow passage 4 passing through outer wall surface sides of the hollow fiber membranes, as shown in FIGS. 1 to 4. Further, gaps between the hollow fiber membrane bundle 1 and the case 2 at both ends of the hollow fiber membrane bundle 1 are sealed by potting members 5, as shown in FIGS. 3 and 4.

Further, the hollow fiber membrane bundle 1 and the case 2 are simultaneously integrated by the potting members 5.

Further, an inlet 31 and an outlet 32 are provided at both ends of the case 2 respectively, for constructing the first flow passage 3.

Further, an entrance 41 and an exit 42 are provided in side surfaces in the vicinity of the both ends of the case 2, for constructing the second flow passage 4.

Further, as shown in FIG. 4, sealing members 6 are interposed between the potting members 5 and an inner peripheral surface of the case 2 respectively.

Accordingly, it is possible to maintain liquid tightness between the potting members 5 and the inner peripheral surface of the case 2.

Further, the sealing members 6 simultaneously seal gaps between both end opening portions of a case main body 21, and a first lid member 22 and a second lid member 23.

Accordingly, since it is possible to simultaneously seal the gap among three members, by one sealing member 6, it is possible to simplify the structure.

As the sealing member 6, a liquid sealing material or a rubber elastic material made packing can be used.

As shown in FIG. 1, the case 2 used in the present embodiment is constructed by the case main body 21 accommodating the hollow fiber membrane bundle 1 and provided with opening portions at both end portions and both side surfaces, the first lid member 22 and the second lid member 23 closing both end opening portions of the case main body 11 and respectively provided with the inlet 31 and the outlet 32 constructing the first flow passage 3, and a third lid member 24 and a fourth lid member 25 closing the opening portions in both side surface of the case main body 21 and respectively provided with the entrance 41 and the exit 42 constructing the second flow passage 4.

The opening portions provided in both side surfaces of the case main body 21 are flat and are formed in a mesh shape.

Accordingly, it is possible to prevent the hollow fiber membrane bundle 1 from being damaged, and it is possible to enhance an exchanging efficiency.

Further, it is possible to maintain liquid tightness between the potting members and the inner peripheral surface of the case even under a thermal influence, by providing the sealing members 6 after the potting members 5 are thermally contracted through application of a heat treatment in an autoclave for a fixed time after the potting members 5 are executed.

Further, as shown in FIG. 4, grooves 26, into which parts of the potting members 5 enter, are provided in inner peripheral surfaces, to which the potting members 5 are executed, at both ends of the case main body 21.

Accordingly, even if the humidifying membrane module is exposed to a thermal and physical shock, it is possible to securely inhibit separation of the case main body 21 and the potting members 5.

The humidifying membrane module in accordance with the present invention is particularly useful when it is used in an apparatus which humidifies and feeds a reaction gas for a polymer electrolyte fuel cell.

In this case, a polyurethane, a silicone, an epoxy, a nylon and the like are appropriately selected and used as a potting material.

Further, a polyether sulphone, a polyimide, a polyolefin and the like are appropriately selected and used as a material of the hollow fiber membrane.

Further, a metal such as aluminum, a stainless steel or the like, and a resin such as a polypropylene, a fluorine contained resin, a polysulphone, an acrylic and the like are appropriately selected and used as a raw material of the case.

Further, needless to say the present invention is not limited to the preferred embodiment for carrying out the invention as mentioned above, but may employ various structures without deviating from the scope of the present invention.

What is claimed is:

1. A humidifying membrane module comprising:
   a hollow fiber membrane bundle formed by a plurality of hollow fiber membranes;
   a case accommodating said hollow fiber membrane bundle;
   a first flow passage passing through hollow inner portions of said hollow fiber membranes; and a second flow passage passing through outer wall surface sides of said hollow fiber membranes, wherein said hollow fiber membrane bundle and said case are simultaneously integrated by potting members sealing gaps between said hollow fiber membrane bundle and said case, at both ends of said hollow fiber membrane bundle, an inlet and an outlet for constructing said first flow passage are provided respectively at both ends of said case, and an entrance and an exit for constructing said second flow passage are provided respectively in side surfaces in the vicinity of said both ends, wherein sealing members are interposed between said potting members and an inner peripheral surface of said case respectively, wherein said case is constructed by a case main body having a rectangular hollow section accommodating said hollow fiber membrane bundle and provided with opening portions at both end portions and both side surfaces each of which is provided on a long side of said case main body, a first lid member and a second lid member closing both end opening portions of said case main body and respectively provided with said inlet and the outlet constructing said first flow passage, and a third lid member and a fourth lid member closing the opening portions in both side surfaces of said case main body and respectively provided with said entrance and said exit constructing said second flow passage, wherein the opening portions provided in both said side surfaces are flat and are formed in a mesh shape, and wherein said sealing members simultaneously seal gaps between both end opening portions of said case main body, and said first lid member and said second lid member.

2. The humidifying membrane module as claimed in claim 1, wherein said sealing members are provided after said potting members are executed and an autoclave treatment is executed for a fixed time.

3. The humidifying membrane module as claimed in claim 1, wherein a liquid sealing material is used for said sealing members.

4. The humidifying membrane module as claimed in claim 1, wherein rubber elastic material made packings are used as said sealing members.

5. The humidifying membrane module as claimed in claim 2, wherein a liquid sealing material is used for said sealing members.

6. The humidifying membrane module as claimed in claim 2, wherein rubber elastic material made packings are used as said sealing members.

* * * * *

UNITED STATES PATENT AND TRADEMARK OFFICE
CERTIFICATE OF CORRECTION

PATENT NO. : 8,414,693 B2
APPLICATION NO. : 12/920551
DATED : April 9, 2013
INVENTOR(S) : Takayuki Takagi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
Twenty-ninth Day of October, 2013

Teresa Stanek Rea
*Deputy Director of the United States Patent and Trademark Office*